United States Patent Office 3,784,626
Patented Jan. 8, 1974

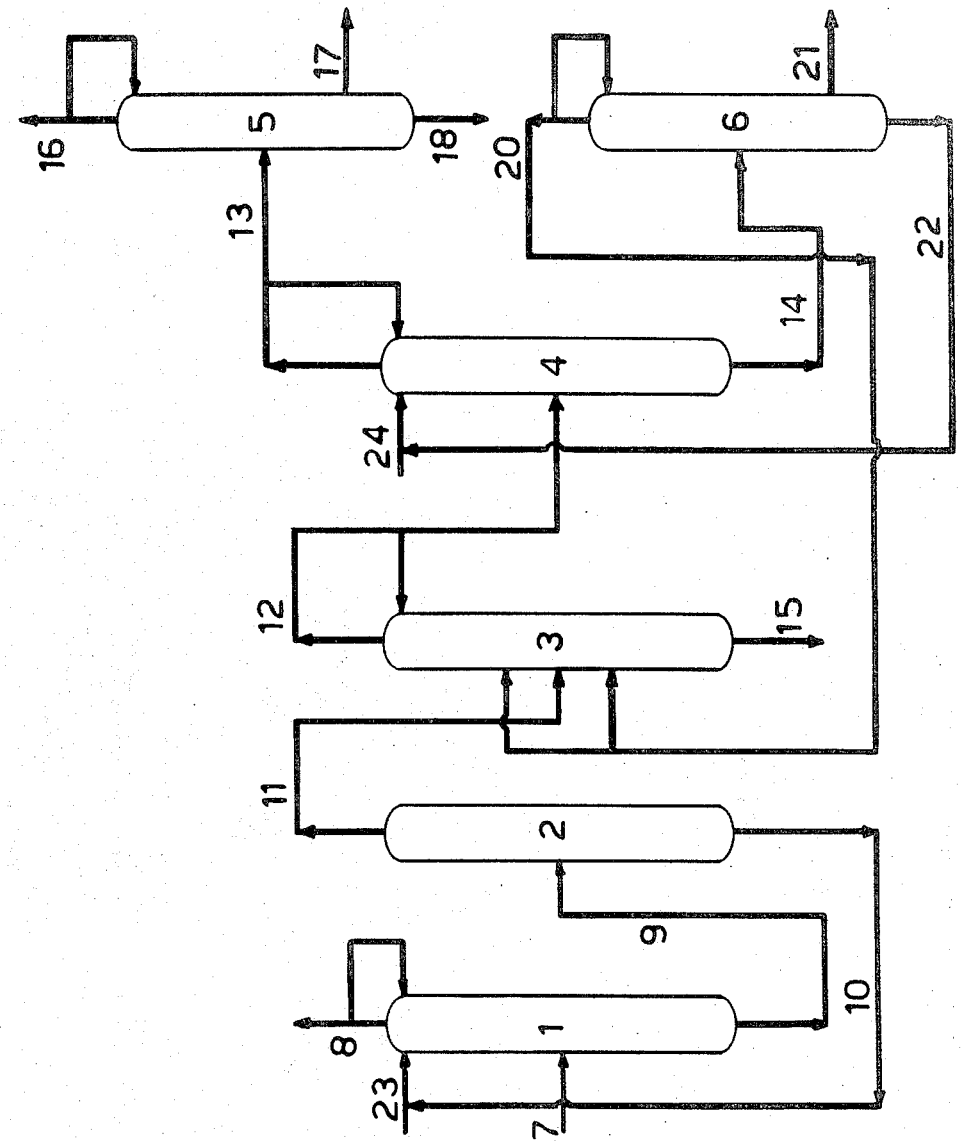

3,784,626
PROCESS FOR THE SEPARATION OF CONJUGATED DIOLEFINS FROM MIXTURES CONTAINING THEM
Alessandro Ginnasi and Carlo Rescalli, San Donato Milanese, Italy, assignors to Snam Progetti, S.p.A., San Donato Milanese, Italy
Filed Dec. 29, 1971, Ser. No. 213,485
Claims priority, application Italy, Dec. 29, 1970, 33,614/70
Int. Cl. C07c 7/08
U.S. Cl. 260—681.5 R      4 Claims

ABSTRACT OF THE DISCLOSURE

A process is disclosed whereby conjugated diolefins, such as isoprene and butadiene, are separated with high selectivity from mixtures containing them through extraction and/or extractive distillation with the aid of an agent consisting of morpholine and another solvent such as an oxygen containing derivative of morpholine and water, e.g., morpholine-water, morpholine-N-formyl morpholine and morpholine-N-formyl morpholine-water.

---

The present invention relates to a process for the separation of conjugated diolefins from mixtures containing them. More particularly the present invention refers to the extraction of butadiene and isoprene from mixtures containing them.

It is known that the conjugated diolefins are becoming increasingly important from the industrial point of view because of their possible use in the production of stereospecific polymers which can be substituted for natural rubber. It is also known that diolefin monomers must have particular purity requirements when they are to be used to yield streospecific polymers in that all the components which negatively affect the catalyst activity and the polymer properties should be removed from such monomers. It is further known that said diolefins can be manufactured according to various preparation processes and the composition of the mixture wherefrom the diolefins are to be recovered differs accordingly.

Generally speaking the preparation methods are:

olefins and saturated compounds are dehydrogenated to dienes chemical synthesis processes which employ carbonyl compounds dienes are extracted from $C_4$ and $C_5$ fractions coming from steam-cracking ethylene plants.

In the first case, in addition to dienes, olefin hydrocarbons having substantially the same number of carbon atoms are present; in the second case aldehydes and ketones are present as components; in the third case saturated, olefin and acetylene compounds are present.

We have now found a simple and economical process, which is the subject of the present invention, for the sparation of diolefins from mixtures containing them. Such a process entails the use of a solvent consisting of a mixture comprising morpholine, the remaining part of the mixture consisting of one or more other solvents and water. More particularly, the present invention involves the employment, as an extraction and/or extractive distillation agent, of a morpholine mixture in the presence of one or more other solvents among which the following can be cited: acetonitrile, furfurol, aniline, dimethylformamide, dimethylacetamide, N - methylpyrrolidone, β-methoxy propionitrile and others; among them, of particular importance in the process of the present invention, are the oxygen containing morpholine derivatives. As oxygen containing morpholine derivative any compound which has an oxygen containing substituent on the morpholine ring can be employed.

More particularly the following may be cited as examples: N-formyl-morpholine, 2-formyl-morpholine, 3 formyl morpholine, morpholine-acetone and the like. As mentioned above, one of the components of the solvent mixture, beside, of course, morpholine can be water.

According to the present invention, the following mixtures are particularly interesting from the industrial point of view: morpholine-water, morpholine-N-formyl morpholine (which shall be called formyl-morpholine) and morpholine-formyl morpholine-water, but also other morpholine containing mixtures with other abovementioned solvents can be employed.

More particularly the morpholine-formylmorpholine, morpholine-water and morpholine - formylmorpholine-water mixtures exhibit very good solvent and selectivity properties, which can be possibly improved by adding one or more of the abovementioned solvents in variable amounts. It is to be noted that the morpholine, being a remarkably stable and inert compound, can be mixed with water without any risk of corrosion. Moreover morpholine is known to have very good anticorrosion properties in the presence of corrosive substances.

It is known that isoprene is obtained with very small amounts of acetylene compounds and cyclopentadiene; more partciularly the amount of this latter compound in the monomer to be sent to polymerization should be lower than few p.p.m. and butadiene, in its turn, should contain few tens of p.p.m. of acetylene compounds. Isoprene and butadiene of such purity are very easily obtained by employing the solvent mixtures used in practicing the present invention. Finally another important feature of the present invention is that the employment of the abovementioned solvent mixtures allows one to operate the column and more particularly the reboilers at low temperature because of the low boiling point of the solvent mixtures themselves as well as the low amount required on the ground of their very good selectivity and solvent power. As a matter of fact, the high solvent power allows one to keep very low solvents/hydrocarbon ratios, with a consequent high hydrocarbon extraction and then with lower operating temperatures. The aforesaid feature implies a lower consumption of vapor required on the whole and furthermore reduces the risk of diene polymerization in the apparatus employed.

As to the solvent mixture compositions employed in the process according to our invention, it is possible to say that morpholine is always present in a concentration higher than 0.5% by weight up to 99% by weight. Water can be present in a concentration varying from 1 to 35%, preferably 1 to 20%, the balance of the mixture consisting of one or more of the other abovementioned solvents.

In the particular case of the oxygen derivatives of morpholine and more particularly of formylmorpholine the concentration can be comprised between 1 and 70% by weight and preferably between 1 and 50% by weight. The process according to the present invention can be utilized to obtain isoprene and butadiene, and also to obtain other dienes such as piperylene, cyclopentadiene, 1.3 hexadiene, 2.4 hexadiene, 2 methyl-pentadiene 1.3,3 methyl pentadiene, 1.3, 1.3 dimethyl butadiene 1.3, 2.3 dimethyl butadiene 1.3, 2 ethyl butadiene 1.3, methyl cyclopentadiene, 2 dimethylcyclopentadiene, 1.3 cyclohexadiene and the like. In the following however we shall refer to isoprene and butadiene.

The solvent mixture which is used in the practice of the present invention can be employed, preferably but not in a restrictive sense, in a process, for instance, for the extraction of isoprene, which includes:

separation of olefins and saturated hydrocarbons by means of a first stage extractive distillation in the presence of the solvent mixtures which are used in the practice of the present invention;

separation of isoprene, monocyclopentadiene and other possible hydrocarbons from the solvent by means of a stripping stage;

separation of the major amount of monocyclopentadiene and practically all of the soluble high boiling hydrocarbons by means of a rectification stage;

separation of monocycylopentadiene, and practically the major quantity of the acetylene compounds (particularly almost all of the polar ones) in the top of the stream leaving the head of the preceding stage, from isoprene by means of a second stage extractive distillation wherein use is made of one of the solvent mixtures which are used in the practice of the present invention, which mixture may be different from the one employed in the first stage extractive distillation;

separation of isoprene, monocyclopentadiene, acetylene compounds and eventually formed dicyclopentadiene from solvent by a stripping stage which allows the recovery of the solvent necessary to the preceding stage;

separation of the soluble low boiling compounds and of acetylene compounds as butyne-2 and isopropylacetylene, still present in isoprene, by a second rectification stage to recover isoprene of a high degree of purity.

The solvent mixtures used in practicing the present invention, may be employed also in some other types of process, because the aforesaid process is not at all limitative thereof. It is also obvious that it is possible to add small amounts of inhibitors.

The invention is now illustrated by the following particular specific examples and by the accompanying drawing showing a means by which the invention may be practically carried out.

With reference to the drawing, the feed mixture, containing isoprene which is to be separated, is introduced into the column 1 by 7; to the same column is fed, through 23, the make-up solvent mixture and, through 10, the recycle solvent.

From the top of the extractive distillation column 1 is removed a stream consisting essentially of the saturated or olefin compounds contained in the feed, whilst from the bottom is removed a stream which, through 9, enters the stripping column 2 wherein isoprene, monocyclopentadiene and all the other hydrocarbons soluble in the solvent are stripped out. This stream goes to the column 3 through 11; the regenerated solvent, through 10, is recycled to the column 1.

To the column 3, besides the cited stream, the head product of a second stripping column is also fed; from the top of 3 goes practically all of the extracted isoprene, which, however, still contains a certain amount of monocyclopentadiene; from the bottom of 3 is removed the greatest amount of monocyclopentadiene and practically all the soluble high boiling hydrocarbons. This stream is removed from the cycle through 15. The extractive distillation column 4 receives, through 12, the overhead product of the column 3, through 24, the make-up solvent (which may be different from the solvent employed in column 1) and, through 22, the recycle solvent regenerated in 6.

The overhead product of the column 4, containing isoprene, is sent to column 5, through 13; in such a rectification stage, the head contains the light soluble hydrocarbons, which go out from the cycle through 16, whereas, through 18, isoprene dimers and oligomers are removed from the bottom. High degree of purity isoprene is extracted from the side stream 17. The bottom product of the column 4, through 14, enters the stripping stage 6, from which dicyclopentadiene is removed by a side stream 21; from the bottom, through 22, the regenerated solvent is recycled to 4 and from the top, through 20, a recycle is carried out to the column 3.

We shall now report three examples relating to the extraction of conjugated diolefins which provide the employment of the solvent mixtures which are used in the practice of the present invention. It is obvious such examples are not limitative thereof. The first two examples refer to the drawing and the extraction of isoprene. The third one refers to butadiene extraction; we shall still refer to the drawing without the intermediate rectification stage (column 3).

EXAMPLE 1

The column 1 was fed by a stream constituted from 100 moles/h. of $C_5$ hydrocarbons having the following composition:

|   | Percent moles |
|---|---|
| Isopentane | 31.9 |
| n-pentane | 25.8 |
| 3 methyl-1 butene | 0.6 |
| 1 pentene | 3.0 |
| 2 methyl-1 butene / 2 pentene trans | 6.4 |
| 2 pentene-cis | 1.4 |
| 2 methyl-2 butene | 2.6 |
| Isoprene | 14.5 |
| 1.3-pentadiene | 4.1 |
| 2 butyne | 0.1 |
| Cyclopentadiene | 9.6 |

The experiment was carried out under the following conditions:

$P_{top}$=1.2 kg./cm.$^2$
$T_{bottom}$=80° C.
L/D=2.5 (reflux ratio)
plates=80
solvent=morpholine-formylmorpholine-water (60/35/5 by weight)
solvent flow rate=30 kg./h.

From the top of the same column were removed:

|   | Moles/h. |
|---|---|
| Isopentane | 31.9 |
| n-pentane | 25.8 |
| 3 methyl-1 butene | 0.6 |
| 1 pentene | 3.0 |
| 2 methyl-1 butene / 2 pentene trans | 6.4 |
| 2 pentene-cis | 1.4 |
| 2 methyl-2- butene | 2.5 |
| Isoprene | 0.2 |

The stream discharged from the bottom of the column 1 was fed to the stripper 2 ($P_{head}$≅-.5 kg./cm.$^2$, Plates=25, $T_{bottom}$=145° C.) from the bottom of which was recovered all the solvent necessary to the first column; the product discharged from the head of the stripper 2 was joined to the one discharged from the stripper 6 and then fed to the column 3 from the bottom of which (through 15) were eliminated:

|   | Moles/h. |
|---|---|
| 2 methyl-2-butene | 0.1 |
| Isoprene | 2.0 |
| 1.3 pentadiene | 4.1 |
| Cyclopentadiene | 9.6 |

The separation in the column 3 was carried out according to the following conditions $P_{head}$=1.2 kg./cm.$^2$
$T_{bottom}$=80° C.
L/D=9
plates=90

The stream discharged from the top of the column 3 was fed to the column 4 working at $P_{head}$=1.2 kg./cm.$^2$
$T_{bottom}$=100° C.
L/D=1.0
plates=70 solvent=morpholine-formylmorpholine-water (60/35/5 by weight)
solvent flow rate=10 kg./h.

From the head was discharged a stream of raw isoprene free from cyclopentadiene (sent to the final rectification):

| | Moles/h. |
|---|---|
| Isoprene | 12.3 |
| Butyne | 0.1 |

The bottom stream of 4 was sent to the stripper 6 working at $P_{head}$=1.2 kg./cm.$^2$
$T_{bottom}$=140° C.
plates=25

The bottom stream 6 (free from hydrocarbons) was again utilized as a solvent in the column 3; the stream coming out from the column was, as aforesaid, always recycled to 3 in order to recover the contained isoprene.

EXAMPLE 2

The column 1 was fed by a stream of 100 moles/h. of C$_5$ hydrocarbons having the following composition:

| | Percent moles |
|---|---|
| Isopentane | 7.6 |
| n-pentane | 10.5 |
| 3 methyl-1 butene | 0.4 |
| 1 pentene | 2.6 |
| 2 methyl-1 butene<br>2 pentene-trans | 4.8 |
| 2 pentene cis | 3.2 |
| 2 methyl-2 butene | 2.9 |
| Isoprene | 30.0 |
| 1.3 pentadiene | 11.2 |
| 2 butyne | 0.8 |
| Cyclopentadiene | 26.0 |

The test was carried out at the following conditions:

$T_{head}$=1.2 kg./cm.$^2$
$T_{bottom}$=75° C.
L/D=4
plates=100
solvent=morpholine-water (93/7 by weight)
solvent flow rate=80 kg./h.

From the top of the same column were removed:

| | Moles/h. |
|---|---|
| Isopentane | 7.6 |
| n-pentane | 10.5 |
| 3 methyl-1 butene | 0.4 |
| 1 pentene | 2.6 |
| 2 methyl-1 butene<br>2 pentene-trans | 4.8 |
| 2 pentene cis | 3.1 |
| 2 methyl-2 butene | 2.7 |
| Isoprene | 0.3 |

The isoprene discharged from the bottom of the column 1 was fed to the stripper 2 at the following conditions:

$P_{head}$=1.5 kg./cm.$^2$
$T_{bottom}$=140° C.
plates=25

From the bottom was recovered all the solvent necessary to the first column, whereas the product discharged from the top was joined to the one discharged from the head of the stripper 6 and then fed to the column 3 from the bottom of which (through 15) were eliminated:

| | Moles/h. |
|---|---|
| 2 pentene cis | 0.1 |
| 2 methyl-2 butene | 0.2 |
| Isoprene | 3.0 |
| 1.3-pentadiene | 11.2 |
| Cyclopentadiene | 26.0 |

The separation in the column 3 was carried out at the following conditions:

$P_{head}$=1.2 kg./cm.$^2$
$T_{bottom}$=90° C.
L/D=11
plates=100

The stream discharged from the head of column 3 was fed to column 4 working at:

$P_{top}$=1.2 kg./cm.$^2$
$T_{bottom}$=25° C.
L/D=1.5
plates=90
solvent=morpholine-water (93/7 by weight)
solvent flow rate=15 kg./h.

From the top was discharged a stream of raw isoprene free from cyclopentadiene (sent to the final rectification):

| | Moles/h. |
|---|---|
| Isoprene | 26.7 |
| Butyne 2 | 0.8 |

The bottom stream of 4 was sent to the stripper 6 working at $P_{head}$=1.2 kg./cm.$^2$
$T_{bottom}$=135° C.
plates=25

The bottom stream of 6 (free from hydrocarbons) was again utilized as a solvent in the column 3, the stream coming out from the top was, as abovesaid, recycled to the same 3 in order to recover isoprene contained therein.

EXAMPLE 3

This test purposed to recover "polymerization grade" butadiene from a steam-cracking stream having the following composition:

| | Percent by weight |
|---|---|
| Saturated and olefin C$_3$ hydrocarbon | 1.4 |
| Butane | 15.8 |
| Isobutane | 4.9 |
| 1 butene | 11.6 |
| Isobutene | 25.6 |
| 2 butene trans | 5.0 |
| 2 butene cis | 3.2 |
| 1.3 butadiene | 32.04 |
| 1.2 butadiene | 0.08 |
| Propyne | 0.05 |
| 1 butyne | 0.07 |
| 2 butyne | 0.26 |

To this purpose the cited stream was fed to a first extractive distillation column working at the following conditions $P_{head}$=3 kg./cm.$^2$
plates=70
L/D=1.5
feeding=vapor phase
feeding flow rate=100 kg./h.
solvent=morpholine-water (93/7 by weight)
solvent flow rate=1000 kg./h.

From the top was discharged a stream containing almost all the saturated and olefine compounds, particularly:

| | Kg./h. |
|---|---|
| Saturated and olefine C$_3$ hydrocarbons | 1.4 |
| Butane | 15.8 |
| Isobutane | 4.9 |
| 1 butene | 11.6 |
| Isobutene | 25.55 |
| 2 butene trans | 5.0 |
| 2 butene cis | 3.1 |
| 1.3 butadiene | 0.94 |

The bottom stream was sent to a stripper working at the following conditions:

$P_{head}$=3.3 kg./cm.$^2$
Plates=25
L/D=0

From the bottom was recovered the solvent free from hydrocarbons necessary to the first extractive distillation column, while the top product was sent to a second extractive distillation column working at $P_{head}$=3 kg./cm.$^2$
Plates=70
L/D=1.5
feeding=vapor phase
solvent=morpholine-water (93/7 b.w.)
solvent flow rate=300 kg./h.

From the head was discharged a stream of raw butadiene which was sen to the usual rectification procedure, the stream consisting of

| | Kg./h. |
|---|---|
| Isobutene | 0.05 |
| Butene 2 cis | 0.1 |
| 1.3 butadiene | 31.0 |
| Propyne | 0.01 |

Whereas such a stream was further rectified by recovering "polymerization grade" butadiene from propyne, the stream coming out from the bottom of the extractive distillation column was sent to a stripper in order to eliminate the contained hydrocarbons and to recover the solvent necessary to the second extractive distillation column.

Such a stripper worked at $P_{head}$=2 kg./cm.$^2$
Plates=25
L/D=0

From the top was discharged a hydrocarbon stream which was eliminated from the cycle and consisting of

| | Kg./h. |
|---|---|
| 1.3 butadiene | 1.0 |
| 1.2 butadiene | 0.08 |
| Propyne | 0.04 |
| 1 butyne | 0.07 |
| 2 butyne | 0.26 |

What we claim is:

1. A process for the separation of a conjugated diolefin from a mixture of hydrocarbons containing said conjugated diolefin and another diene, comprising:

a first extractive distillation step wherein said hydrocarbon mixture is contacted with a solvent mixture of from about 0.5 to 60% by weight of morpholine, from about 1 to 50% by weight of a formyl morpholine and the balance to 100% by weight of water, to recover an extract containing dissolved hydrocarbons including said conjugated diolefin and other diene;

a first stripping step wherein the hydrocarbons in said extract are separated from the solvent;

a second extractive distillation stop wherein hydrocarbons, including conjugated diolefin and other diene from said stripping step, are contacted with a second solvent mixture of from about 0.5 to 60% by weight of morpholine, from about 1 to 50% by weight of a formyl morpholine and the balance to 100% by weight of water to separate the conjugated diolefin from the principal balance of said hydrocarbons; and a final rectification step whereby the conjugated diolefin is recovered in a high state of purity.

2. A process as claimed in claim 1 wherein the hydrocarbons separated from solvent in the first extractive distillation step are subjected to a first rectification step wherein the conjugated diolefin and other diene sent to the second extractive distillation step are first separated from other hydrocarbons recovered in the preceding stripping step.

3. A process as claimed in claim 1 wherein the conjugated diolefin is butadiene.

4. A process as claimed in claim 2 wherein the conjugated diolefin is isoprene.

References Cited

UNITED STATES PATENTS

| | | | |
|---|---|---|---|
| 3,673,081 | 6/1972 | Preusser et al. | 208—326 |
| 3,344,198 | 9/1967 | Weitz et al. | 260—681.5 |
| 2,357,667 | 9/1944 | Kuhn | 208—326 |
| 3,510,405 | 5/1970 | Takao et al. | 260—681.5 |
| 3,681,202 | 8/1972 | Funkhouser | 260—681.5 |
| 3,655,806 | 4/1972 | Brandt et al. | 260—681.5 |

DELBERT E. GANTZ, Primary Examiner

C. E. SPRESSER, Assistant Examiner

U.S. Cl. X.R.

203—58; 208—313, 326; 260—666 A